J. T. CAMPBELL.
INDICATOR.
APPLICATION FILED OCT. 27, 1913.
1,220,318.
Patented Mar. 27, 1917.
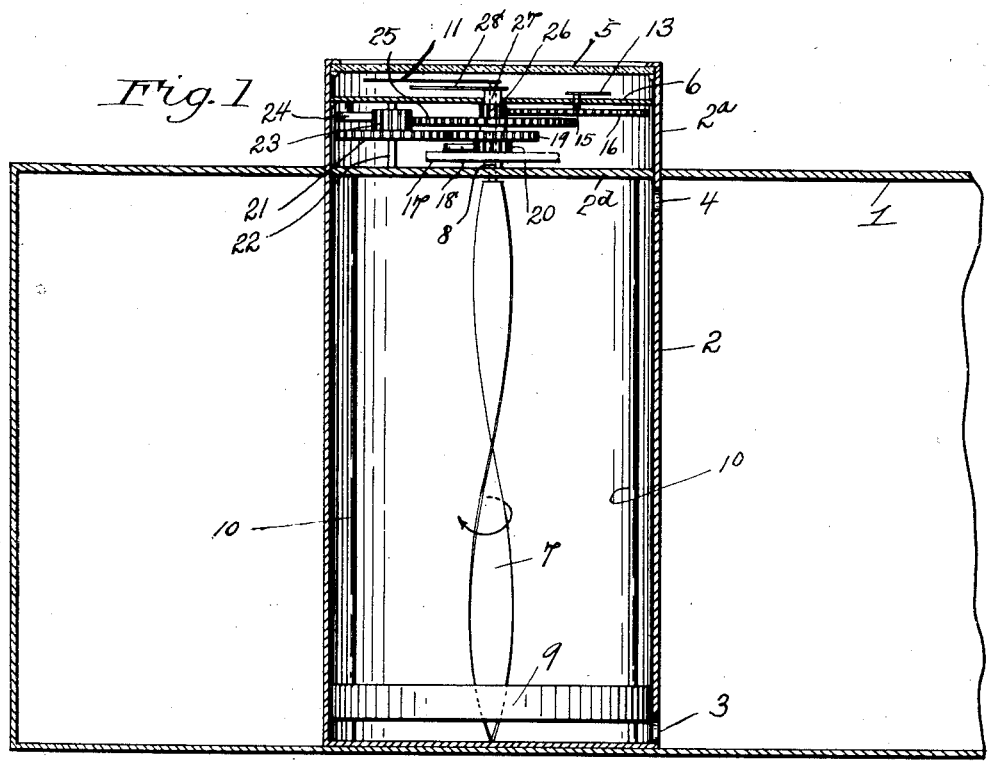
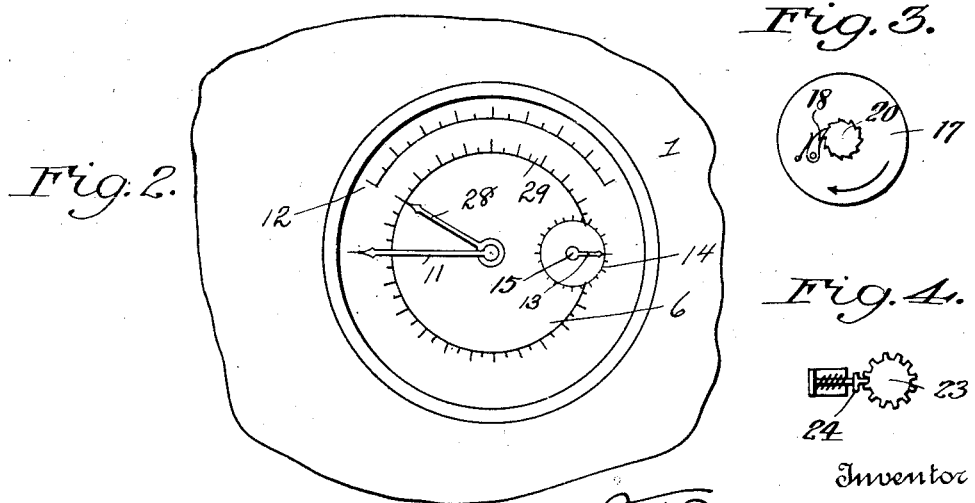
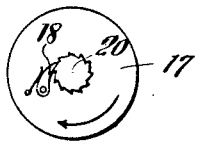
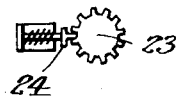
Witnesses
Inventor
J. T. Campbell
by James J. Sheehy & Co.
Attorneys

UNITED STATES PATENT OFFICE.

JOHN THOMAS CAMPBELL, OF NORFOLK, VIRGINIA, ASSIGNOR OF ONE-HALF TO CLIFTON G. KEESEE, OF NORFOLK, VIRGINIA.

INDICATOR.

1,220,318.      Specification of Letters Patent.      Patented Mar. 27, 1917.

Application filed October 27, 1913. Serial No. 797,574.

*To all whom it may concern:*

Be it known that I, JOHN THOMAS CAMPBELL, citizen of the United States, residing at Norfolk, in the county of Norfolk and State of Virginia, have invented new and useful Improvements in Indicators, of which the following is a specification.

My present invention pertains to indicators, and it has for its object to provide an indicator for denoting the quantity of liquid in a tank at all times, and for also indicating the amount of liquid taken from the tank in a predetermined period.

The device is designed more particularly for use in connection with the gasolene tank of an automobile with a view to enabling the owner to detect when the machine has been used by another person without authority; and it will be fully understood from the following description and claim when the same are read in connection with the drawings, accompanying and forming part of this specification, in which:

Figure 1 is a view, partly in elevation and partly in vertical section, of the indicator constituting the preferred embodiment of my invention.

Fig. 2 is a detail plan of the dial face and the indicator hands or pointers disposed above said face.

Fig. 3 is a detail plan showing the pawl 18 and the ratchet portion 20 with which it coöperates.

Fig. 4 is a similar view showing the relation of the pawl 24 and the gear portion 23.

Referring by numerals to the said drawing:

1 is the gasolene tank of an automobile, and 2 is an upright tube disposed in said tank. The said tube is provided at 3 with one or more apertures for the passage of gasolene, and at 4 with a vent opening.

A portion of the tube 2 is extended above the top of the tank 1, as indicated by 2ª, and is provided with a transparent top 5, and a dial 6, disposed below said top; the said dial being preferably, though not necessarily, provided with three groups of graduations, as shown in Fig. 2. Obviously the said graduations may be of any suitable description and may be numbered if desired, or the numbers may be omitted without affecting my invention.

Within a casing formed by the tube portion 2ª, a wall 2ᵈ fixed in the tube and the dial 6 is arranged a train of gearing hereinafter described, and journaled at its lower end in the center of the tube 2 is a twisted shaft 7. This twisted shaft is provided at its upper end with a shaft portion 8 of circular form in cross-section, and the latter is journaled in the wall 2ᵈ, and is extended upwardly through the dial 6.

The twisted shaft 7 extends through an oblong aperture in a float 9, disposed and adapted to move vertically in the tube 2; the said float being held against turning by upright fixed rods 10, or other suitable means. From this it follows that upward movement of the float 9 will be attended by rotation of the shaft 7 in one direction, and that downward movement of the float will be attended by rotation of the shaft in the opposite direction. With this understanding and the further understanding that the shaft portion 8 is provided at its upper end with a hand or pointer 11, designed to coöperate with graduations 12, it will be manifest that an automobile owner is enabled at all times to see the quantity of gasolene that is contained in the tank 1, the hand or pointer 11 moving in one direction when the float 9 is raised by the placing of gasolene in the tank, and in the other direction when the float gravitates on withdrawal of gasolene from the tank, and being adapted to remain at rest when the float is at rest.

13 is a hand or pointer adapted to coöperate with graduations 14 on the dial 6. The said hand 13 is carried by an arbor 15, that is journaled in the dial 6 and is provided below the same with a large spur gear 16.

Fixedly mounted on the shaft portion 8 is a wheel or disk 17, equipped with a spring-pressed or other suitable pawl 18, and loosely mounted upon the said shaft portion 8, and located immediately above the wheel or disk 17 is a spur gear 19. This spur gear 19 is provided with a reduced ratchet portion 20 designed to coöperate with the pawl 18 when the wheel 17 is rotated by the downward movement of the float 9, as when gasolene is taken from the tank 1. The said gear 19 is intermeshed with a gear 21, that is loosely mounted on a post 22, and is provided with a combined gear and ratchet portion 23. With this said portion 23 a pawl 24 coöperates to prevent retrograde movement of the gear 21 and the gear 19, when the float is raised by the supply of gasolene to the tank 1, and the pawl 18 rides idly over the teeth of the ratchet portion 20, and this without interfering with rotation of the gears 19 and 21 incidental to downward movement of the float 9, since when gasolene is withdrawn from the tank 1 the ratchet portion 20 and the gear 19 are caused to turn by the pawl 18 on disk 17.

Loosely mounted on the shaft portion 8 is a spur gear 25, intermeshed with the portion 23 of gear 21. The said gear 25 is provided with a reduced gear portion 26, intermeshed with the gear 16, and is further provided with an upwardly extending sleeve 27, disposed in the dial 6 and equipped with a hand or pointer 28, adapted to coöperate with graduations 29 on the dial 6. The pawl 24 is preferably connected with and supported by the dial 6 as shown.

It will be manifest from the foregoing that when gasolene is put into the tank 1 the hands or pointers 28 and 13 will remain idle. When, however, the float 9 moves downwardly incidental to the withdrawal of gasolene from the tank 1, the hands or pointers 28 and 13 will be moved; the movement of the hand or pointer 13 being much slower than the movement of the hand or pointer 28.

It will also be manifest that by referring to the pointers 13 and 28 the owner of a car is enabled to ascertain the quantity of gasolene consumed in a certain period, and by noting the positions of the said pointers when the car leaves his possession and when it is returned he is enabled to tell whether the car has been used, and if so to what extent.

It will be appreciated from the foregoing that my novel indicator is simple and inexpensive in construction and reliable in operation, and that it embodies no delicate parts such as are liable to get out of order after a short period of use.

Having described my invention, what I claim and desire to secure by Letters-Patent, is:

In an indicator, the combination of a tube, a dial wall supported therein, a shaft extending through said wall and rotatable in opposite directions, a gear loose on the shaft, means intermediate the shaft and said gear for rotating the gear on the rotation of the shaft in one direction and leaving the gear idle on rotation of the shaft in the opposite direction, a support connected with the dial wall, a second gear loosely mounted on said support and intermeshed with the first-named gear and having at its side adjacent to the dial wall a comparatively-small, central combined ratchet and gear portion, a pawl supported on the dial wall and arranged to coöperate with said combined ratchet and gear portion, and a third gear loose on the shaft and carrying a hand and intermeshed with said combined ratchet and gear portion.

In testimony whereof I have hereunto set my hand in presence of two subscribing witnesses.

JOHN THOMAS CAMPBELL.

Witnesses:
C. G. TRAYWICK,
J. S. BAURBORAT.